(12) United States Patent
Ishikawa et al.

(10) Patent No.: US 10,055,615 B2
(45) Date of Patent: Aug. 21, 2018

(54) CARD READER

(71) Applicant: NIDEC SANKYO CORPORATION, Suwa-gun, Nagano (JP)

(72) Inventors: Kazutoshi Ishikawa, Nagano (JP); Katsuhisa Higashi, Nagano (JP); Yukihiko Takita, Nagano (JP); Yohei Shimizu, Nagano (JP)

(73) Assignee: NIDEC SANKYO CORPORATION, Nagano (JP)

( * ) Notice: Subject to any disclaimer, the term of this patent is extended or adjusted under 35 U.S.C. 154(b) by 0 days.

(21) Appl. No.: 15/563,091

(22) PCT Filed: Mar. 29, 2016

(86) PCT No.: PCT/JP2016/060130
§ 371 (c)(1),
(2) Date: Sep. 29, 2017

(87) PCT Pub. No.: WO2016/158952
PCT Pub. Date: Oct. 6, 2016

(65) Prior Publication Data
US 2018/0075263 A1    Mar. 15, 2018

(30) Foreign Application Priority Data
Mar. 30, 2015 (JP) .................. 2015-067983

(51) Int. Cl.
*G06K 7/08* (2006.01)
(52) U.S. Cl.
CPC .................... *G06K 7/087* (2013.01)
(58) Field of Classification Search
CPC .................................................. G06K 7/087

USPC ........................................... 235/450
See application file for complete search history.

(56) References Cited

U.S. PATENT DOCUMENTS

2008/0290167 A1* 11/2008 von Mueller .......... G06K 7/084
235/449
2016/0189024 A1* 6/2016 Rampetzreiter ... G06K 19/0723
235/492

FOREIGN PATENT DOCUMENTS

| JP | 58129585 A | 8/1983 | |
| JP | H05314313 A | 11/1993 | |
| JP | H11510299 A | 9/1999 | |
| JP | 3936496 B2 | 6/2007 | |
| JP | WO 2014195991 A1 * | 12/2014 | ......... G07F 19/2055 |
| WO | 2012085967 A1 | 6/2012 | |

OTHER PUBLICATIONS

International Search Report corresponding to Application No. PCT/JP2016/060130; dated Jun. 21, 2016.

* cited by examiner

*Primary Examiner* — Toan Ly
(74) *Attorney, Agent, or Firm* — Cantor Colburn LLP

(57) ABSTRACT

A card reader may include a card insertion port; a magnetoresistive (MR) sensor; and a disturbing magnetic field generator, wherein the card may include a magnetic stripe, and magnetic data recorded in the magnetic stripe may be arranged in a moving direction of the card inserted through the card insertion port. The MR sensor may include a first resistor and a second resistor separated by a distance which is less than a bit interval of magnetic data, in a case that "0" data are recorded in the magnetic stripe, in the moving direction of the card.

4 Claims, 2 Drawing Sheets

CARD READER

CROSS REFERENCE TO RELATED APPLICATIONS

This is the U.S. national stage of application No. PCT/JP2016/060130, filed on Mar. 29, 2016. Priority under 35 U.S.C. § 119(a) and 35 U.S.C. § 365B is claimed from Japanese Application No. 2015-067983, filed on Mar. 30, 2015; the disclosure of which are incorporated herein by reference.

TECHNICAL FIELD

At least an embodiment of the present invention relates to a card reader structured to perform reading of magnetic data recorded in a card and recording of magnetic data to the card.

BACKGROUND

Conventionally, a card reader has been widely utilized, which performs reading of magnetic data recorded in a card and recording of magnetic data to the card. In an industry such as a financial institution where a card reader is utilized, illegal acquisition of magnetic data of a card by a fraudulent person who attaches a magnetic head to a card insertion part of a card reader, in other words, so-called skimming has conventionally become a large issue. In order to cope with the issue, a card reader has been proposed, which generates a disturbing magnetic field for preventing reading of magnetic data using a magnetic head for skimming (hereinafter, referred to as a "skimming magnetic head") (see, for example, Patent Literature 1).

A card reader described in Patent Literature 1 includes: a disturbing magnetic field generator that generates a disturbing magnetic field; a conveying roller that conveys a card inserted through a card insertion port; and a motor that drives the conveying roller. The card reader also includes a magnetic head (pre-head) that detects whether magnetic data are recorded in a magnetic stripe of the card inserted through the card insertion port. In the card reader, when the pre-head detects that the magnetic data are recorded in the magnetic stripe of the card inserted through the card insertion port, the motor is activated to drive the conveying roller. The card is thus taken into the card reader. Also in the card reader, after the activation of the motor, the disturbing magnetic field generator generates a disturbing magnetic field during a period of time in which a rear end side of the card is protruded from the card insertion port.

Patent Literature 1: Japanese Patent No. 3936496

In the card reader described in Patent Literature 1, for the purpose of surely preventing skimming using a skimming magnetic head, the disturbing magnetic field generator generates a disturbing magnetic field before the magnetic stripe of the card inserted through the card insertion port reaches the pre-head and, further, the disturbing magnetic field generator generates a disturbing magnetic field for a predetermined period of time after the magnetic stripe has reached the pre-head. In other words, in the card reader described in Patent Literature 1, for the purpose of surely preventing skimming using a skimming magnetic head, a disturbing magnetic field is also generated at the time when the pre-head reads magnetic data.

According to examinations of the present inventors, however, they have found that, in the card reader described in Patent Literature 1, in a case that a disturbing magnetic field is generated at the time when the pre-head reads magnetic data, an output signal from the pre-head varies owing to the disturbing magnetic field, which makes it difficult for the pre-head to appropriately detect whether magnetic data are recorded in a magnetic stripe. In other words, according to the examinations of the present inventors, they have found that, in the card reader described in Patent Literature 1, it is difficult for the pre-head to appropriately detect whether magnetic data are recorded in a magnetic stripe of a card inserted through the card insertion port, in a state in which a disturbing magnetic field is generated.

SUMMARY

In view of the problem described above, at least an embodiment of the present invention provides a card reader capable of appropriately detecting whether magnetic data are recorded in a magnetic stripe of a card inserted through a card insertion port, even in a state in which a disturbing magnetic field is generated.

To achieve the above, at least an embodiment of the present invention provides a card reader including: a card insertion port into which a card having a magnetic stripe is inserted; a magnetoresistive (MR) sensor that detects whether magnetic data are recorded in the magnetic stripe; and a disturbing magnetic field generating means that generates a disturbing magnetic field for disturbing illegal reading of the magnetic data recorded in the magnetic stripe. The magnetic data recorded in the magnetic stripe are arranged in a moving direction of the card inserted through the card insertion port. The MR sensor includes a first resistor and a second resistor that are disposed to be separated by a distance which is less than a bit interval of magnetic data in a case that "0" data are recorded in the magnetic stripe, from each other in the moving direction of the card.

In the card reader according to at least an embodiment of the present invention, the MR sensor for detecting whether magnetic data are recorded in a magnetic stripe includes the first resistor and the second resistor. In at least an embodiment of the present invention, further, the first resistor and the second resistor are disposed to be separated by the distance which is less than the bit interval of the magnetic data in the case that the "0" data are recorded in the magnetic stripe, from each other in the moving direction of the card, the moving direction being coincided with the arranging direction of the magnetic data. In other words, the distance between the first resistor and the second resistor is very short in the moving direction of the card. In at least an embodiment of the present invention, therefore, it is possible to narrow a difference between an amount of change in resistance of the first resistor and an amount of change in resistance of the second resistor, the difference being caused owing to a disturbing magnetic field generated by the disturbing magnetic field generating means. In at least an embodiment of the present invention, further, the first resistor and the second resistor are disposed to be separated by the distance which is less than the bit interval of the magnetic data in the case that the "0" data are recorded in the magnetic stripe, from each other in the moving direction of the card, the moving direction being coincided with the arranging direction of the magnetic data. It is therefore possible to widen a difference between an amount of change in resistance of the first resistor and an amount of change in resistance of the second resistor, the difference being caused owing to the magnetic data recorded in the magnetic stripe. In at least an embodiment of the present invention, accordingly, even in a state in which a disturbing magnetic field is generated, it is possible to appropriately detect whether magnetic data are recorded in a magnetic stripe of a card inserted through the card insertion port, based on a difference between an amount of change in resistance of the first resistor and an amount of change in resistance of the second resistor.

In at least an embodiment of the present invention, the first resistor and the second resistor are disposed to be separated by a distance which is a half of the bit interval of the magnetic data in the case that the "0" data are recorded in the magnetic stripe, from each other in the moving direction of the card. The international standard or JIS standard specifies that "0" data are recorded in a preamble on a tip end side of a magnetic stripe. With this structure, in a case that magnetic data are recorded in a magnetic stripe of a card specified in the international standard or JIS standard, it is possible to further widen a difference between an amount of change in resistance of the first resistor and an amount of change in resistance of the second resistor, the difference being caused owing to the magnetic data. It is accordingly possible to more appropriately detect whether magnetic data are recorded in a magnetic stripe, based on a difference between an amount of change in resistance of the first resistor and an amount of change in resistance of the second resistor.

In at least an embodiment of the present invention, the first resistor and the second resistor are connected in series, one of the first resistor and the second resistor is connected to a power supply, the other one of the first resistor and the second resistor is grounded, and the MR sensor outputs a potential at a midpoint between the first resistor and the second resistor. With this structure, the MR sensor outputs the difference between the amount of change in resistance of the first resistor and the amount of change in resistance of the second resistor as it is. Therefore, the output signal from the MR sensor can be processed with ease as compared with, for example, a case that the first resistor and the second resistor are connected in parallel.

In at least an embodiment of the present invention, the MR sensor includes multiple sets of first resistors and second resistors, and the MR sensor detects whether magnetic data are recorded, for each track to be recorded in the magnetic stripe. With this structure, it is possible to more appropriately detect whether magnetic data of multiple tracks are recorded in a magnetic stripe.

As described above, a card reader according to at least an embodiment of the present invention is capable of appropriately detecting whether magnetic data are recorded in a magnetic stripe of a card inserted through a card insertion port, even in a state in which a disturbing magnetic field is generated.

BRIEF DESCRIPTION OF DRAWINGS

Embodiments will now be described, by way of example only, with reference to the accompanying drawings which are meant to be exemplary, not limiting, and wherein like elements are numbered alike in several Figures, in which.

DETAILED DESCRIPTION

Embodiments of the present invention will be described below with reference to the accompanying drawings.
(Structure of Card Reader)

Figure 1:
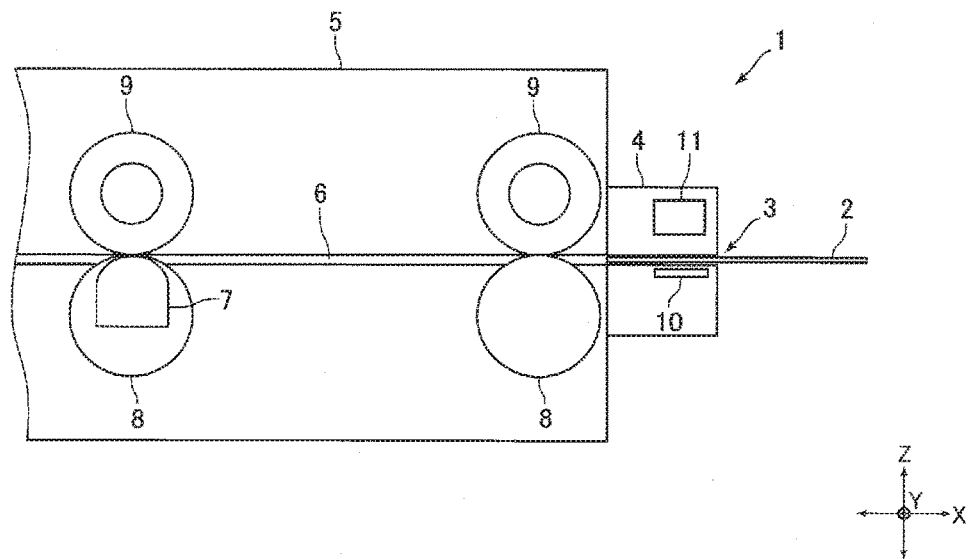
FIG. 1 is a schematic view showing a card reader in accordance with an embodiment of the present invention.
Figure 2:
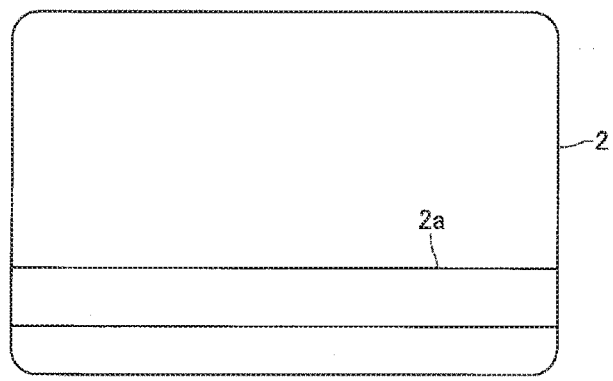
FIG. 2 is a view showing a rear face of a card shown in FIG. 1.

FIG. 1 is a schematic view showing a card reader 1 in accordance with an embodiment of the present invention. FIG. 2 is a view showing a rear face of a card 2 shown in FIG. 1.

The card reader 1 in this embodiment is a device for performing reading of magnetic data recorded in the card 2 and recording of magnetic data to the card 2 and is mounted for use on a predetermined host apparatus such as an automated teller machine (ATM). The card reader 1 includes a card insertion part 4 formed with a card insertion port 3 into which the card 2 is inserted, and a main body part 5. An inside of the card reader 1 is formed with a card passage 6 where the card 2 inserted through the card insertion port 3 is passed.

In this embodiment, the card 2 inserted through the card insertion port 3 moves in an "X" direction shown in FIG. 1. In other words, the "X" direction is a moving direction of the card 2. Further, a "Z" direction in FIG. 1 perpendicular to the "X" direction is a thickness direction of the card 2 taken into the card reader 1, and a "Y" direction in FIG. 1 perpendicular to the "X" direction and the "Z" direction is a width direction of the card 2 taken into the card reader 1.

The card 2 is a substantially rectangular-shaped card made of vinyl chloride whose thickness is about 0.7-0.8 mm. A rear face of the card 2 is formed with a magnetic stripe 2a in which magnetic data are recorded. The magnetic stripe 2a is formed along a longitudinal direction of the card 2 formed in a substantially rectangular shape. The magnetic data recorded in the magnetic stripe 2a are arranged in a longitudinal direction of the magnetic stripe 2a (in other words, the longitudinal direction of the card 2). The card 2 in this embodiment is a card which is specified in the international standard or JIS standard, and "0" data are recorded on a preamble on a tip end side of the magnetic stripe 2a.

The card 2 is inserted into the card reader 1 and moves inside the card reader 1 in a state in which its rear face is directed downward and its longitudinal direction is substantially coincided with the "X" direction (the moving direction of the card 2). In other words, the magnetic data recorded in the magnetic stripe 2a are arranged in the moving direction of the card 2. An IC chip and a communication antenna may be incorporated into the card 2. Further, the card 2 may be a PET (polyethylene terephthalate) card whose thickness is about 0.18-0.36 mm and may be a paper card having a predetermined thickness.

The card reader 1 also includes a magnetic head 7 that performs reading of magnetic data recorded in the magnetic stripe 2a of the card 2 and recording of magnetic data to the magnetic stripe 2a, a drive roller 8 and a pad roller 9 that convey the card 2 along the card passage 6, a magnetoresistive (MR) sensor 10 that detects whether magnetic data are recorded in the magnetic stripe 2a, and a disturbing magnetic field generating means 11 that generates a magnetic field (disturbing magnetic field) for preventing illegal reading of magnetic data recorded in the magnetic stripe 2a.

The magnetic head 7, the drive roller 8, and the pad roller 9 are disposed in the main body part 5. The MR sensor 10 and the disturbing magnetic field generating means 11 are disposed in the card insertion part 4. The magnetic head 7 is disposed to face the card passage 6 from below. Further, the magnetic head 7 is located at a position where the magnetic stripe 2a is passed in the "Y" direction. The drive roller 8 and the pad roller 9 are disposed to face each other in an upper and lower direction. The pad roller 9 is urged toward the drive roller 8. The MR sensor 10 is disposed to face the card passage 6 from below. A specific structure of the MR sensor 10 will be described later.

The disturbing magnetic field generating means 11 includes a core that is formed of a magnetic material, and an excitation coil that is wound around the core. For example, the core and the coil are disposed above the card passage 6. The coil is connected to an alternating-current power supply circuit that feeds electric current to the coil. When electric current is fed to the coil, a disturbing magnetic field is generated toward a front side of the card reader 1 and toward the position where the magnetic stripe 2a is passed. The core and the coil may be disposed below the card passage 6.

In the card reader 1, when a card insertion detection mechanism (not shown) detects that the card 2 has been inserted into the card insertion port 3, the disturbing magnetic field generating means 11 generates a disturbing magnetic field, and electric power is supplied to the MR sensor 10.

(Structure of MR Sensor)

Figure 3:
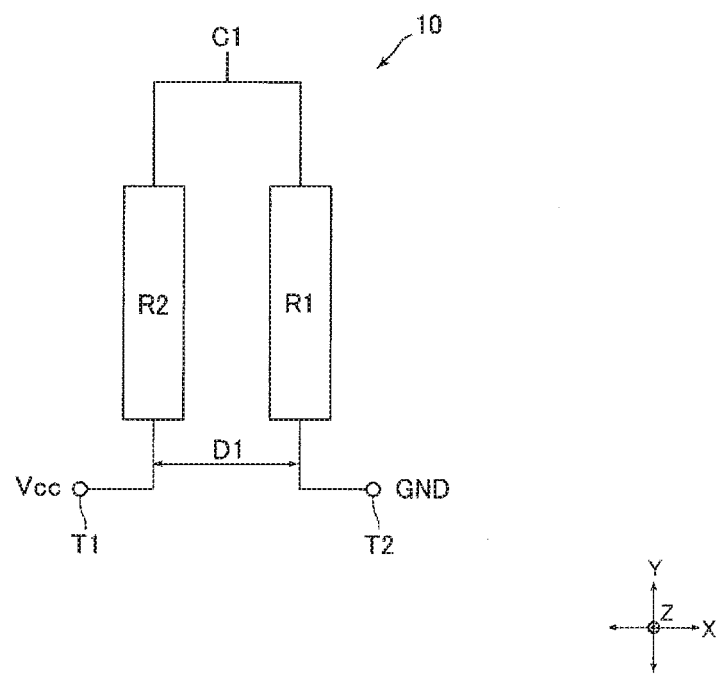
FIG. 3 is an explanatory view showing a structure of an MR sensor shown in FIG. 1.

FIG. 3 is an explanatory view showing a structure of the MR sensor 10 shown in FIG. 1.

As shown in FIG. 3, the MR sensor 10 is magneto resistive effect element including a first resistor R1 (hereinafter, referred to as a "resistor R1") and a second resistor R2 (hereinafter, referred to as a "resistor R2") connected in series. Each of the resistors R1 and R2 is formed of, for example, a thin film of a nickel-iron alloy. The resistors R1 and R2 are formed by being folded multiple times in the "Y" direction (a short widthwise direction of the card 2). For example, the resistors R1 and R2 are formed by being folded twice in the "Y" direction. Alternatively, each of the resistors R1 and R2 is formed in a straight shape parallel to the "Y" direction. Each of the resistors R1 and R2 may be formed of any material in addition to a nickel-iron alloy.

The resistor R2 is connected to a power supply Vcc. Specifically, one end of the resistor R2, which is not connected to the resistor R1, is connected to a connection terminal T1 to the power supply Vcc, and the connection terminal T1 is connected to the power supply Vcc. The resistor R1 is grounded. Specifically, one end of the resistor R1, which is not connected to the resistor R2, is connected to a ground terminal T2, and the ground terminal T2 is grounded. Further, the MR sensor 10 outputs a potential at a midpoint C1 between the resistor R1 and the resistor R2 connected in series (a node between the resistor R1 and the resistor R2).

A resistance value of the resistor R1 and a resistance value of the resistor R2 are equal to each other. In this embodiment, a length in the "Y" direction of the resistor R1 and a length in the "Y" direction of the resistor R2 are equal to each other. Further, this length is narrower than a width in the "Y" direction of the magnetic data recorded in the magnetic stripe 2a. This length is, for example, 2 mm. Further, a width in the "X" direction of the resistor R1 and a width in the "X" direction of the resistor part R2 are equal to each other. This width is, for example, 60 μm. Further, a thickness of the resistor R1 and a thickness of the resistor R2 are equal to each other. This thickness is, for example, 45 nm.

The resistor R1 and the resistor R2 are located at the same position in the "Y" direction. Specifically, the resistor R1 and the resistor R2 are located at a position where the magnetic stripe 2a is passed in the "Y" direction. Further, the resistor R1 and the resistor R2 are disposed to be separated from each other by a distance D1 in the "X" direction. The distance D1 is less than a maximum bit interval of the magnetic data recorded in the magnetic stripe 2a. In other words, the distance D1 is less than a bit interval of magnetic data in a case that "0" data are recorded in the magnetic stripe 2a.

In this embodiment, the distance D1 corresponds to a half of a bit interval of magnetic data in the case that the "0" data are recorded in the magnetic stripe 2a. In other words, the distance D1 is identical to a bit interval of magnetic data in a case that "1" data are recorded in the magnetic stripe 2a. For example, when a recording density of magnetic data recorded in the magnetic stripe 2a is 75 bpi, the distance D1 is 0.17 mm (=25.4/(75×2)). Further, when a recording density of magnetic data recorded in the magnetic stripe 2a is 210 bpi, the distance D1 is 0.18 mm (=25.4×3/(210×2)). In the case that the resistors R1 and R2 are formed by being folded multiple times in the "Y" direction, the distance D1 is a distance between a portion closest to the resistor R2 of the resistor R1 and a portion closest to the resistor R1 of the resistor R2.

(Principal Effects in this Embodiment)

As described above, in this embodiment, the resistor R1 and the resistor R2 are disposed to be separated from each other by the distance D1 in the "X" direction, and the distance D1 is a half of a bit interval of magnetic data in a case that "0" data are recorded in the magnetic stripe 2a. In other words, in this embodiment, the distance in the "X" direction between the resistor R1 and the resistor R2 is very short. In this embodiment, therefore, it is possible to narrow a difference between an amount of change in resistance of the resistor R1 and an amount of change in resistance of the resistor R2, the difference being caused owing to a disturbing magnetic field generated by the disturbing magnetic field generating means 11. Also in this embodiment, the distance D1 in the "X" direction between the resistor R1 and the resistor R2 is the half of the bit interval of the magnetic data in the case that the "0" data are recorded in the magnetic stripe 2a. It is therefore possible to widen a difference between an amount of change in resistance of the resistor R1 and an amount of change in resistance of the resistor R2, the difference being caused owing to the "0" data recorded in the magnetic stripe 2a.

Also in this embodiment, the resistance value of the resistor R1 and the resistance value of the resistor R2 are equal to each other, and the MR sensor 10 outputs the potential at the midpoint C1 between the resistor R1 and the resistor R2. Also in this embodiment, when the card insertion detection mechanism (not shown) detects that the card 2 has been inserted into the card insertion port 3, the disturbing magnetic field generating means 11 generates a disturbing magnetic field, and electric power is supplied to the MR sensor 10. In this embodiment, therefore, in a case that magnetic data are recorded in the magnetic stripe 2a of the card 2 inserted into the card insertion port 3, when the card 2 moves toward the rear side of the card reader 1, an output signal SG1 from the MR sensor 10 varies as shown in FIG. 4.

Figure 4:
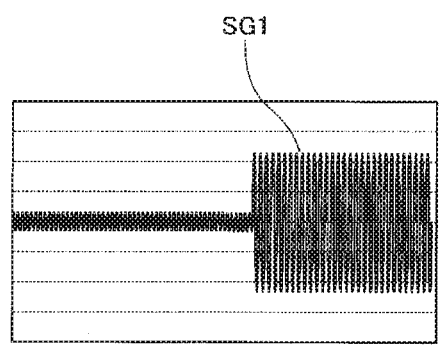
FIG. 4 is a view showing an exemplary output signal from the MR sensor shown in FIG. 3.

As shown in FIG. 4, the amplitude of the output signal SG1 is lesser before a magnetic data recording region of the magnetic stripe 2a reaches the MR sensor 10 (in other words, before the preamble of the magnetic stripe 2a reaches the MR sensor 10). When the preamble of the magnetic stripe 2a reaches the MR sensor 10, the amplitude of the output signal SG1 becomes greater. In this embodiment, accordingly, even in the state in which a disturbing magnetic field is generated, the MR sensor 10 can appropriately detect whether magnetic data are recorded in the magnetic stripe 2a of the card 2 inserted through the card insertion port 3.

(Other Embodiments)

Described above is an example of at least an embodiment according to the present invention. However, the present invention is not limited to the above embodiment and various variations and modifications may be made without changing the concept of the present invention.

In the embodiment described above, the resistor R1 and the resistor R2 are connected in series. Alternatively, the resistor R1 and the resistor R2 may be connected in parallel. In this case, it is sufficient to detect whether magnetic data are recorded in the magnetic stripe 2a, on the basis of a difference between an amount of change in resistance of the resistor R1 and an amount of change in resistance of the resistor R2, the difference being calculated using a predetermined circuit. However, when the resistor R1 and the resistor R2 are connected in series as in the embodiment described above, the MR sensor 10 can output the difference between the amount of change in resistance of the resistor R1 and the amount of change in resistance of the resistor R2 as it is. Therefore, the output signal from the MR sensor 10 can be processed with ease as compared with the case that the resistor R1 and the resistor R2 are connected in parallel.

In the embodiment described above, the distance D1 between the resistor R1 and the resistor R2 is the half of the bit interval of the magnetic data in the case that the "0" data are recorded in the magnetic stripe 2a; however, the present invention is not limited thereto. For example, the distance D1 may be any distance in addition to the half of the bit interval of the magnetic data in the case that the "0" data are recorded in the magnetic data as long as the distance D1 is less than the bit interval of the magnetic data in the case that the "0" data are recorded in the magnetic stripe 2a.

In the embodiment described above, the magnetic stripe 2a may be recorded with magnetic data of multiple tracks. In this case, the MR sensor 10 includes multiple sets of first resistors and second resistors that detect whether magnetic data are recorded for each track. For example, the magnetic stripe 2a may be recorded with magnetic data of two tracks, i.e., magnetic data of a first track and magnetic data of a second track. In this case, the MR sensor 10 includes a first resistor and a second resistor that detect whether magnetic data are recorded in the first track. The MR sensor 10 also includes a first resistor and a second resistor that detect whether magnetic data are recorded in the second track. In this case, further, the first resistor and the second resistor for detecting whether magnetic data are recorded in the first track are structured similarly to the resistor R1 and the resistor R2 in the embodiment described above. The first resistor and the second resistor for detecting whether magnetic data are recorded in the second track are also structured similarly to the resistor R1 and the resistor R2 in the embodiment described above. A distance in the "X" direction between the first resistor and the second resistor for detecting whether magnetic data are recorded in the first track is set to be, for example, a half of a bit interval of magnetic data in a case that "0" data are recorded in the first track. Further, a distance in the "X" direction between the first resistor and the second resistor for detecting whether magnetic data are recorded in the second track is set to be, for example, a half of a bit interval of magnetic data in a case that "0" data are recorded in the second track.

In the embodiment described above, the card reader 1 is a card conveyance type card reader including a drive roller 8 and a pad roller 9. Alternatively, the card reader 1 may be a manually operated type card reader that is manually operated by a user.

While the description above refers to particular embodiments of the present invention, it will be understood that many modifications may be made without departing from the spirit thereof. The accompanying claims are intended to cover such modifications as would fall within the true scope and spirit of the present invention.

The presently disclosed embodiments are therefore to be considered in all respects as illustrative and not restrictive, the scope of the invention being indicated by the appended claims, rather than the foregoing description, and all changes which come within the meaning and range of equivalency of the claims are therefore intended to be embraced therein.

The invention claimed is:

1. A card reader for use with a card having a magnetic stripe, the card reader comprising:
   a card insertion port into which the card is inserted;
   a magnetoresistive (MR) sensor structured to detect whether magnetic data are recorded in the magnetic stripe; and
   a disturbing magnetic field generator structured to generate a disturbing magnetic field for disturbing illegal reading of the magnetic data recorded in the magnetic stripe,
   wherein
   the magnetic data recorded in the magnetic stripe are arranged in a moving direction of the card inserted through the card insertion port, and
   the MR sensor comprises a first resistor and a second resistor that are disposed to be separated by a distance which is less than a bit interval of magnetic data in a case that "0" data are recorded in the magnetic stripe, from each other in the moving direction of the card.

2. The card reader according to claim 1, wherein
the first resistor and the second resistor are disposed to be separated by a distance which is a half of the bit interval of the magnetic data in the case that the "0" data, are recorded in the magnetic stripe, from each other in the moving direction of the card.

3. The card reader according to claim 1, wherein
the first resistor and the second resistor are connected in series,
one of the first resistor and the second resistor is connected to a power supply,
the other one of the first resistor and the second resistor is grounded, and
the MR sensor outputs a potential at a midpoint between the first resistor and the second resistor.

4. The card reader according to claim 1, wherein
the MR sensor comprises multiple sets of first resistors and second resistors, and
the MR sensor is structured to detect whether magnetic data are recorded, for each track to be recorded in the magnetic stripe.

\* \* \* \* \*